United States Patent
Brown et al.

[15] 3,645,491

[45] Feb. 29, 1972

[54] SOLUBLE METAL CASTING CORES COMPRISING A WATER-SOLUBLE SALT AND A SYNTHETIC RESIN

[72] Inventors: Warwick N. Brown; Peter M. Robinson, both of Birmingham, England

[73] Assignee: Aeroplane and Motor Aluminum Castings Limited, Birmingham, England

[22] Filed: July 22, 1969

[21] Appl. No.: 843,774

[52] U.S. Cl.................249/61, 164/43, 260/2.5 M, 260/38, 260/39, 260/56, 260/57 R, 260/59, 260/68, 260/69 R, 264/DIG. 44

[51] Int. Cl...............B22c 1/22, B28b 7/34, C08q 5/10, C08g 9/10, C08g 51/04

[58] Field of Search...............164/43; 260/68, 69, 69 N, 56, 260/59, 57, 2.5 M; 106/38.3, 38.5, 38.9; 264/DIG. 44; 249/61

[56] References Cited

UNITED STATES PATENTS

| | | | |
|---|---|---|---|
| 3,116,522 | 1/1964 | Taylor | 164/43 |
| 3,062,760 | 11/1962 | Dermody et al. | 260/2.5 M |
| 3,326,822 | 6/1967 | Albertson | 260/2.5 M |
| 3,356,129 | 12/1967 | Anderko et al. | 249/61 |
| 3,407,864 | 10/1968 | Anderko et al. | 106/38.9 |
| 3,459,253 | 8/1969 | Woolcott | 249/61 |
| 3,548,914 | 12/1970 | Hill et al. | 164/41 |
| 3,577,367 | 5/1971 | Lang | 164/43 |

FOREIGN PATENTS OR APPLICATIONS

| | | | |
|---|---|---|---|
| 725,240 | 1/1966 | Canada | 260/59 |
| 854,844 | 11/1960 | Great Britain | 260/59 |

OTHER PUBLICATIONS

Chem Abst.: 10063 e, N. V. Philips Gdoeil. (Belgian 632,865), " Core Material for Casting Patterns in Wax Molds."

"Process of Making Molds and Cores," McCulloch, p. 2, paragraph 5, TS 236.M3, Off of Tech. Services.

*Primary Examiner*—William H. Short
*Assistant Examiner*—Edward Woodberry
*Attorney*—Holcombe, Wetherill and Brisebois

[57] ABSTRACT

This invention discloses novel water-soluble cores for use in the casting of metals, and also methods of making such cores. The cores essentially consist of a water-soluble salt and a synthetic resin.

One form of the core consists of a mixture of a water-soluble salt and a liquid synthetic resin binder such as to retain the salt grains in the agglomerate. Another form of the core consists of grains of a water-soluble salt which are coated with a synthetic resin and subsequently dried to a powder.

14 Claims, No Drawings

SOLUBLE METAL CASTING CORES COMPRISING A WATER-SOLUBLE SALT AND A SYNTHETIC RESIN

The present invention relates to soluble cores for use in the casting of metals. The term "soluble core" as used herein means a core formed either entirely or mainly of constituents which are soluble in water so that the core may be removed from a casting formed around the core by dissolving the soluble constituents in water, which also serves to wash away any insoluble constituents present in the core material.

According to the present invention, a soluble core for use in metal casting comprises a water-soluble salt and a synthetic resin.

The soluble core may consist of a mixture of a water-soluble salt and a liquid resin binder such as to retain the salt grains in the agglomerate.

Alternatively the soluble core may consist of grains of a water-soluble salt, preferably of a controlled grain size, which are coated with a synthetic resin and subsequently dried to a powder.

The water-soluble salt may be a granular or crystalline chloride, sulphate or carbonate salt or any compatible mixture of such salts. In such cases the salts are soluble in either hot or cold water.

Examples of the synthetic resin are:
urea formaldehyde type,
phenol formaldehyde type, (resol or novolak)
melamine formaldehyde type,
urea furfuryl type
phenol furfuryl type,
sugar or glucose-based type,
-or any compatible combination of the materials,
including any necessary accelerator or catalyst required for the conversion of the resin to a preformed hardened state.

The mixture of water-soluble salt and resin may be injected or blown into a core box, in which the resin is subsequently cured and the core is formed. Alternatively the core box may be filled manually.

The amount of resin added to the salt depends upon the type of resin used and the strength required in the resulting core. The resin content in the mixture generally does not exceed 10 percent by weight of the salt, and in some cases will be between 7½ and 5 percent. The salt-resin mixture generally has the consistency of damp sand. The mixture may be dried to a powder before blowing into a core box and cured to form the core.

In one method of making a soluble core according to this invention, the required amount of resin and catalyst is added to the water-soluble salt and the constituents thoroughly mixed together to form a damp mass. The mixture is then injected under pressure into a core box, the injection pressure being between 70 and 110 p.s.i. Alternatively the mixture is dried to a powder and blown into a core box. The resin is then cured at a temperature of, e.g., between 150° and 300° C., depending on the percentage and type of resin used in the mixture.

The resin-curing temperature is, however, below the melting point of the salt, so as to retain the salt content of the core in granular (not fused) form and bond it by the cured resin.

One example of the core composition consists of granular sodium chloride, bonded together in an agglomerate by a synthetic resin of a phenol formaldehyde-furfuryl alcohol type. This was mixed in proportions as follows:

| | |
|---|---|
| Sodium Chloride | base material |
| Phenol-Furane resin | 2.5% by weight of salt |
| Accelerator required | 25% by weight of resin |

To assess the properties of this particular core composition, a series of tests were devised to show the curing and mechanical properties of that composition. Thus, a range of curing times and temperatures were used, the cores being cured for from 5 seconds to 2 minutes over a temperature range from 150° to 250° C.

In the tests, standard A.F.S. (American Foundrymens Society) one-inch cross-sectional area tensile cores were blown at 85 p.s.i. into a core box, the resin being cured for a specific time at a specific temperature.

To show the mechanical properties of this system, it was decided, for each time and temperature, to break a core after the desired curing time and to retain one until cooled to room temperature, an average of five samples being taken. For cores cured for 90 seconds at a temperature of 250° C., a hot tensile strength in excess of 125 p.s.i. and a room temperature tensile strength in excess of 300 p.s.i. were found.

Ideally, in any core-making system not only should the chosen binder exhibit high tensile strength after baking, but it should also possess a low gas-evolution rate during the casting procedure, as well as resistance to moisture pickup in storage.

Gas evolution rates of the system were measured by standard evolution tests in a controlled atmosphere furnace. The quantity of gas evolved over an evolution time of 90 seconds was approximately 12 ml./g. at N.T.P.

Resistance to moisture absorption was measured by the fall in strength percent of a fully cured A.F.S. one-inch tensile core, after 72 hours standing in normal foundry-storage conditions.

The results of these tests showed that as regards hot and cold strengths, gas evolution rate, and resistance to moisture absorption, soluble cores according to this invention are comparable to resin-bonded silica sand cores.

SOLUBILITY TESTS

A standard one-inch A.F.S. tensile core of the above composition, blown at 80 p.s.i., cured 20 seconds at 220° C. was agitated in a water bath at 50° C. Adequate dissolution occurred after 3 minutes, total dissolution after 25 minutes.

It will be appreciated that in the post-casting stages, initial breakdown will have occurred at the metal-core interface, to possibly a depth of one-half inch, and this will facilitate ease of dissolution by the breakdown of "closed" surfaces.

Thus a soluble-salt core of weight 75 g. dissolves in 3 minutes (although dependent on the type and quantity of resin used), i.e., per 100 g., mass, dissolution to a satisfactory extent occurs after 4 minutes.

CASTING PROPERTIES

The casting properties were determined by making several experimental castings using a soluble core, and examining the surface finish of the casting.

In all the castings examined substantially no evidence was found of surface reaction between the salt and metal, indeed surface finish was in some cases superior to silica-sand hotbox cores and comparable to the shell-sand process. A variation in the mechanical grading of the salt not only improved surface finish to a large degree, but also raised the tensile strengths of the cured test specimens by up to 10 percent.

We claim:
1. A water-soluble core for use in metal casting, comprising grains of a water-soluble salt up to about 10 percent by weight of said salt of a synthetic resin binder in the form of a solid water-soluble core which can be washed out of the core cavity with water after the casting step is completed.

2. The water-soluble core of claim 1, comprising a mixture of a water-soluble salt and a liquid resin binder to retain the salt grains in the agglomerate.

3. The water-soluble core of claim 1, comprising grains of a water-soluble salt which are coated with a synthetic resin.

4. The water-soluble core of claim 1, in which the water-soluble salt is a granular or crystalline chloride, sulphate or carbonate salt or any compatible mixture of such salts.

5. The water-soluble core of claim 1, which also includes a catalyst or accelerator required for the conversion of the resin to a preformed hardened state.

6. The water-soluble core of claim 1, wherein the synthetic resin is a melamine formaldehyde resin.

7. The water-soluble core of claim 1, wherein the synthetic resin is a phenol formaldehyde resin.

8. The water-soluble core of claim 1, wherein the synthetic resin is a phenol furfuryl resin.

9. The water-soluble core of claim 1, wherein the synthetic resin is a urea furfuryl resin.

10. The water-soluble core of claim 1, wherein the synthetic resin is a urea formaldehyde resin.

11. A method of making a water-soluble core comprising grains of a water soluble salt and up to 10 percent by weight of said salt of a synthetic resin wherein the water-soluble salt and resin are injected or blown into a core box in which the resin is subsequently cured and the core is formed.

12. The method as claimed in claim 11, in which grains of a water-soluble salt are coated with a synthetic resin and subsequently dried to a powder prior to blowing into a core box, the temperature of which is raised to cure the resin.

13. A method of making a soluble core as claimed in claim 11, comprising the steps of adding the synthetic resin to the water-soluble salt, thoroughly mixing together the synthetic resin and the water-soluble salt to form a damp mass, injecting said damp mass under pressure into a core box, and heating the core box sufficient to cure the synthetic resin.

14. The method as claimed in claim 13, in which the mixture is injected into the core box at an injection pressure between 70 and 110 p.s.i.

* * * * *

UNITED STATES PATENT OFFICE
CERTIFICATE OF CORRECTION

Patent No. 3,645,491      Dated February 29, 1972

Inventor(s) WARWICK N. BROWN and PETER M. ROBINSON

It is certified that error appears in the above-identified patent and that said Letters Patent are hereby corrected as shown below:

Claim 1, line 2, after "salt" insert --and--.

Signed and sealed this 5th day of September 1972.

(SEAL)
Attest:

EDWARD M. FLETCHER, JR.
Attesting Officer

ROBERT GOTTSCHALK
Commissioner of Patents